(12) United States Patent
Capoldi

(10) Patent No.: US 10,208,796 B2
(45) Date of Patent: Feb. 19, 2019

(54) SEGMENTED CAGE FOR A BEARING

(71) Applicant: Bruno Capoldi, Charentenay (FR)

(72) Inventor: Bruno Capoldi, Charentenay (FR)

(73) Assignee: Aktiebolaget SKF, Göteborg (SE)

( * ) Notice: Subject to any disclaimer, the term of this patent is extended or adjusted under 35 U.S.C. 154(b) by 17 days.

(21) Appl. No.: 15/214,046

(22) Filed: Jul. 19, 2016

(65) Prior Publication Data

US 2017/0023064 A1 Jan. 26, 2017

(30) Foreign Application Priority Data

Jul. 20, 2015 (EP) .................... 15306178

(51) Int. Cl.
*F16C 19/38* (2006.01)
*F16C 19/54* (2006.01)
*F16C 33/51* (2006.01)
*F16C 33/46* (2006.01)

(52) U.S. Cl.
CPC .......... *F16C 33/513* (2013.01); *F16C 19/381* (2013.01); *F16C 19/545* (2013.01); *F16C 33/4617* (2013.01); *F16C 2300/14* (2013.01); *F16C 2352/00* (2013.01); *F16C 2360/31* (2013.01)

(58) Field of Classification Search
CPC .... F16C 33/3818; F16C 33/51; F16C 33/513; F16C 33/516; F16C 2204/12; F16C 2300/14; F16C 2352/00; F16C 2360/31
See application file for complete search history.

(56) References Cited

U.S. PATENT DOCUMENTS 3,938,866 A 2/1976 Martin
8,882,361 B2 * 11/2014 Sekido .................... E02F 9/123
  384/591
2013/0223780 A1 8/2013 Mangold et al.

FOREIGN PATENT DOCUMENTS

| DE | 3245332 A1 | 6/1984 |
| DE | 3512202 A1 | 10/1986 |
| DE | 10010075 A1 * | 9/2001 |
| JP | H710554 * | 7/1993 |
| JP | 2011-133061 * | 7/2011 |
| JP | 2011-163513 * | 8/2011 |
| JP | 2012140982 A | 7/2012 |
| JP | 2013036510 A | 2/2013 |

* cited by examiner

*Primary Examiner* — James Pilkington
(74) *Attorney, Agent, or Firm* — Bryan Peckjian; SKF USA Inc. Patent Dept.

(57) ABSTRACT

A segmented cage for a bearing is provided. The segmented cage provides at least two successive segments each being able to receive at least one rolling element. These segments have inner and outer circumferential faces and adjacent end faces abutting circumferentially one on the other. The adjacent end faces are shaped to obtain only one contact line or contact point between them, the contact point or contact line being distant from the inner and outer circumferential faces.

11 Claims, 7 Drawing Sheets

SEGMENTED CAGE FOR A BEARING

CROSS-REFERENCE TO RELATED APPLICATIONS

This application claims priority to European patent application no. 15306178.3 filed on Jul. 20, 2015, the contents of which are fully incorporated herein by reference.

FIELD OF THE INVENTION

The present invention relates to the field of bearings including rolling elements and spacing cages for maintaining these rolling elements.

BACKGROUND OF THE INVENTION

Particularly in the field of large-diameter bearings, for example large-diameter rolling bearings adapted to be used in wind turbines or tunnel boring machines, it is known to use segmented cages which provide segments abutting circumferentially and having pockets for receiving the rolling elements.

Currently, the adjacent segments provide flat abutting surfaces which are in contact one on the other. When these segments pivot radially relative to each other, the contact plat surfaces take off from one another and the segments stay in contact only on inner or outer contacts, increasing the median nominal diameter of the cages.

Otherwise, as described in the U.S. Pat. No. 3,938,866, the contact abutting surfaces are cylindrical. One of these cylindrical surfaces is convex and is engaged in the other cylindrical surface which is concave, the diameters of these cylindrical surfaces being equal. When these segments pivot radially relative to each other, either the contact cylindrical surfaces take off from one another and the segments stay in contact only on inner or outer contacts or the cylindrical surfaces stay in contact and slide one over the other, the segments shifting radially one relative to the other.

The above situations induce untimely deteriorations and are not satisfying.

SUMMARY OF THE INVENTION

According to one embodiment, it is proposed a segmented cage for a bearing, comprising at least two successive segments each being able to receive at least one rolling element, these segments having inner and outer circumferential faces and adjacent end faces abutting circumferentially one on the other.

The adjacent end faces are shaped to obtain only one contact line or contact point between them, the contact point or contact line being distant from the inner and outer circumferential faces.

The contact point or contact line can be located in central zones of the ends faces distant from the inner and outer circumferential faces.

One of the end faces can have a convex shape.
The other end face can have a convex shape.
The other end face can have a concave shape.
The other face can have a flat shape.
One of the end faces can have a convex cylindrical shape, with an axis parallel to the axis of the cage.

The other end face can have a convex cylindrical shape.

The cylindrical shape of one of the end faces can be concave and the other one can be convex, the radius of the concave cylindrical shape being greater than the radius of the convex cylindrical shape.

One of the end faces can have a convex spherical shape.

It is also proposed a bearing comprising two rings, rolling elements interposed between the rings and, for receiving the rolling elements, the cage.

BRIEF DESCRIPTION OF THE DRAWINGS

The present invention and its advantages will be better understood by studying a bearing with a segmented cage, given by way of non-limiting example and illustrated by the appended drawings on which.

DETAILED DESCRIPTION OF THE INVENTION

Figure 1:
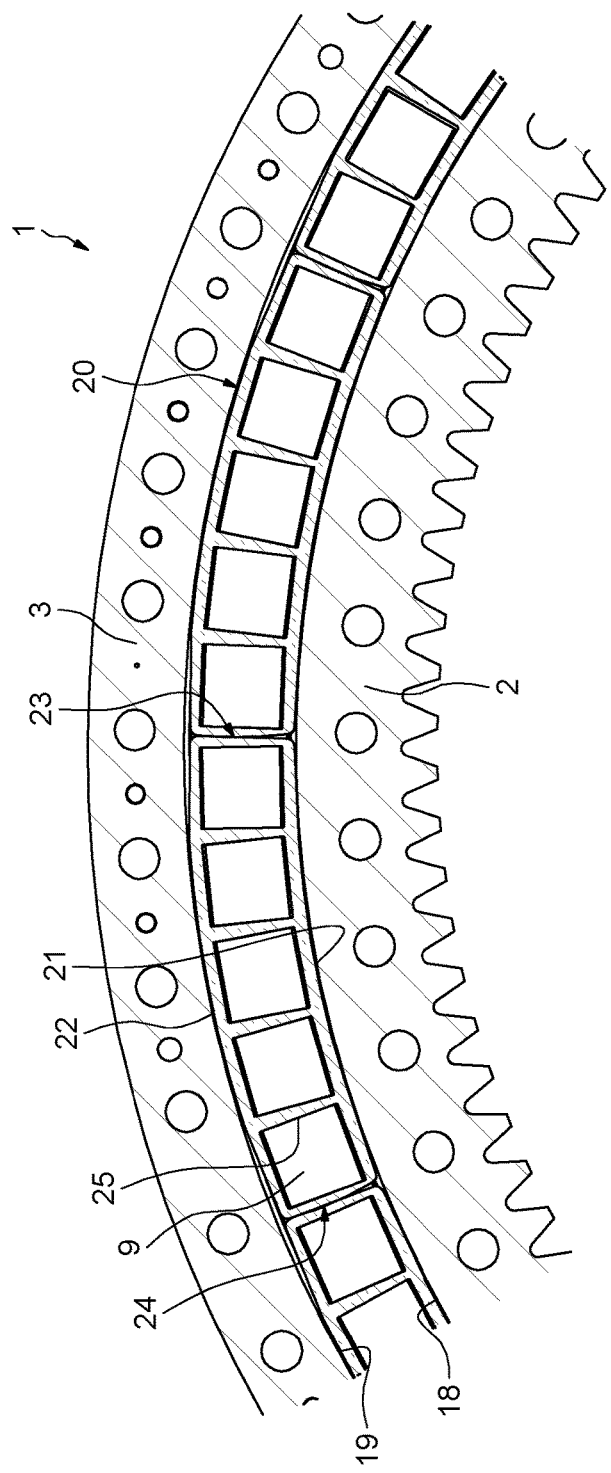
FIG. 1 is a partial radial cross-section of a bearing, passing through a cage.
Figure 2:
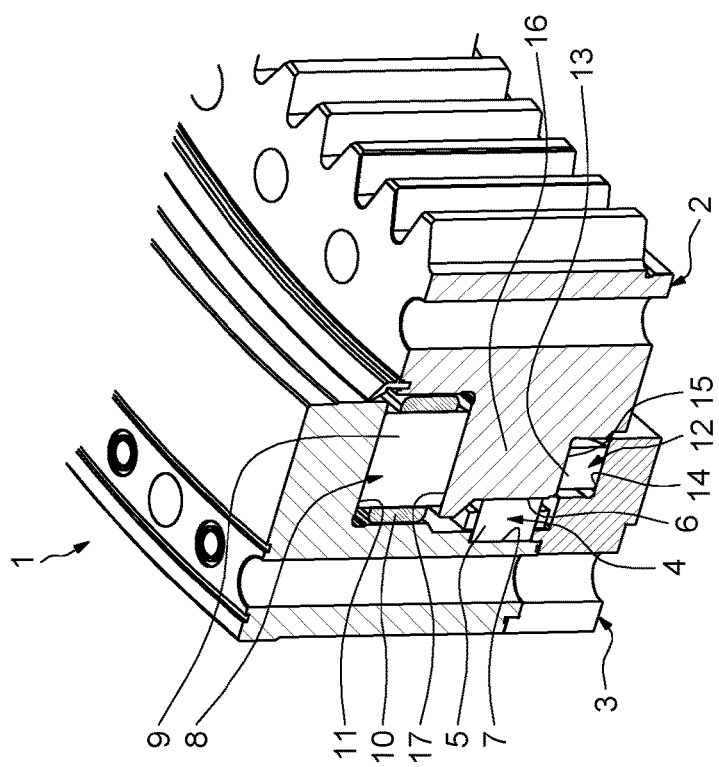
FIG. 2 is a perspective view in an axial cross-section of the bearing of FIG. 1.

As illustrated on FIGS. 1 and 2, a bearing 1 provides an inner ring 2 and an outer ring 3 which are concentric and rotatable about an axis (not shown), this axis being for example disposed vertically. The rings 2 and 3 are connected for example through the following rows of rolling elements.

For supporting radial loads, the bearing 1 provides a row 4 of rolling elements 5 such as rollers, which are provided between raceways of the rings 2 and 3, which are provided between radially spaced apart cylindrical raceways 6 and 7 of the rings 2 and 3, the raceways 6 and 7 being radially spaced apart.

For supporting axial loads, from top to bottom, the bearing 1 comprising a top row 8 of rolling elements 9 such as rollers, which are provided between annular radial raceways 17 and 11 of the rings 2 and 3, the raceways 17 and 11 being axially spaced apart.

For supporting axial loads, from bottom to top, the bearing 1 comprising a bottom row 12 of rolling elements 13 such as rollers, which are provided between annular radial raceways 14 and 15 of the rings 2 and 3, the raceways 14 and 15 being axially spaced apart.

The inner ring 2 provides an outer annular portion 16 having axially on both sides the raceways 17 and 15 and having on its outer face the raceway 6.

The rolling elements 9 of the row 8 are maintained spaced apart through a cage 10 which can be in plastic, or metallic material such as bronze alloy. Therefore the cage can be obtained from injection molding, sand molding or machining.

The cage 10 is disposed between cylindrical faces 18 and 19 of the rings 2 and 3, which delimits radially the space in which the rolling elements 9 are moving.

The cage 10 is segmented and is constituted of a plurality of successive segments 20. Each segment 20 has inner and outer circumferential cylindrical faces 21 and 22 adjacent to the cylindrical faces 18 and 19 of the rings 2 and 3 and has circumferentially opposed abutting end faces 23 and 24 such that the adjacent end faces 23 and 24 of two successive adjacent segments 20A and 20B are abutting circumferentially. Each segment 20 is provided with axially transverse pockets 25 receiving respectively some of the rolling elements 9. Referring now to FIG. 2, the inner ring 2, when viewed in axial section, forms a first axially extending radial surface located adjacent to the inner circumferential face of each segment. The outer ring 3, when viewed in axial section, forms a second axially extending radial surface located adjacent to the outer circumferential face of each segment such that a portion of the cage is located between each of the axial ends of each roller and the first and second axially extending radial surfaces.

Figure 3:
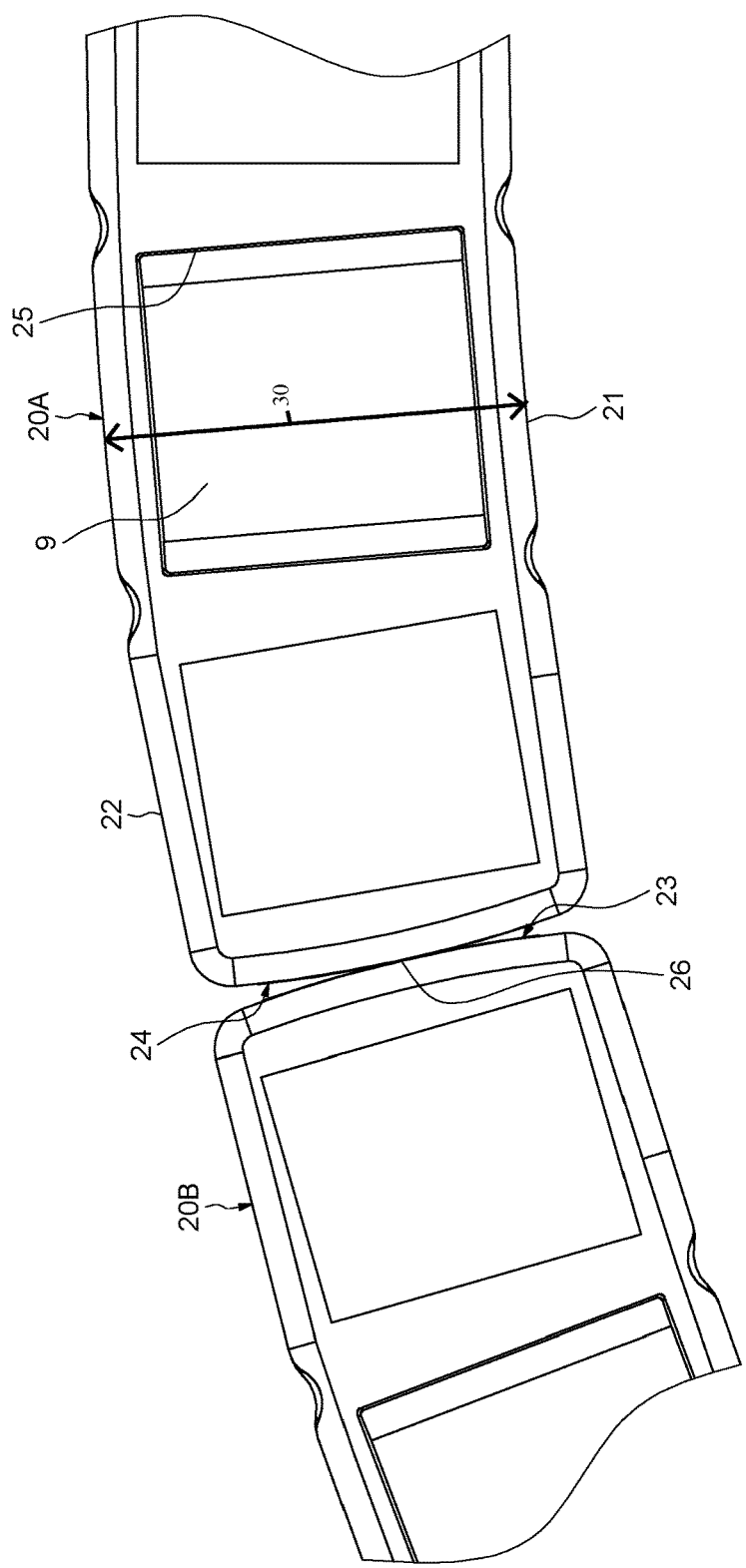
FIG. 3 is a top view of a portion of two segments of the cage, according to one embodiment.
Figure 4:
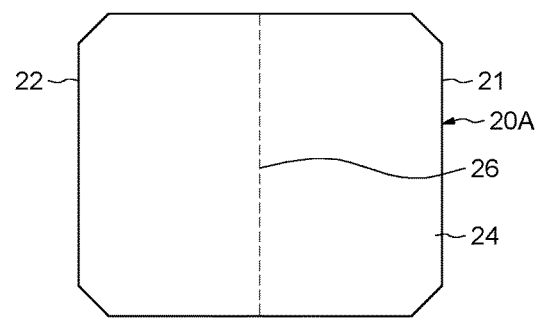
FIG. 4 is an end view of a segment of FIG. 3.

As illustrated on FIGS. 3 and 4, according to one embodiment, the end faces 23 and 24 of each segment 20 have the shape of convex cylindrical shapes having axial axis parallel to the axis of the bearing 1 or the cage 10, or equivalent shapes, such that the end faces 23 and 24 of two successive adjacent segments 20A and 20B are abutting only along an axial contact line 26. The segments 20A and 20B each having a distance 30 between the inner circumferential face 21 and the outer circumferential face 22 that decreases proximate to the first end face and the second end face.

This contact line 26 is distant from the inner and outer circumferential cylindrical faces 21 and 22 thereof and preferably located in a central zone of the end faces, for example at substantially equal distances from the inner and outer circumferential cylindrical faces 21 and 22 thereof.

Figure 5:
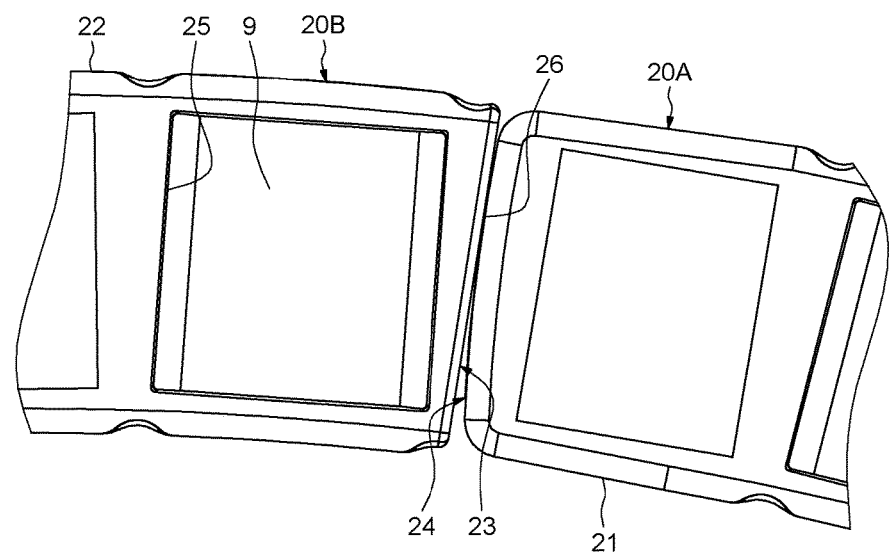
FIG. 5 is a top view of a portion of two segments of the cage, according to another embodiment.

As illustrated on FIG. 5, according to another embodiment, the end faces 23 and 24 of each segment 20 have one a convex cylindrical shape and the other a flat shape.

Also in this case, the end faces 23 and 24 of two successive adjacent segments 20A and 20B are abutting along an axial contact line 26 as illustrated on FIG. 4, which is located substantially at an equivalent position.

Figure 6:
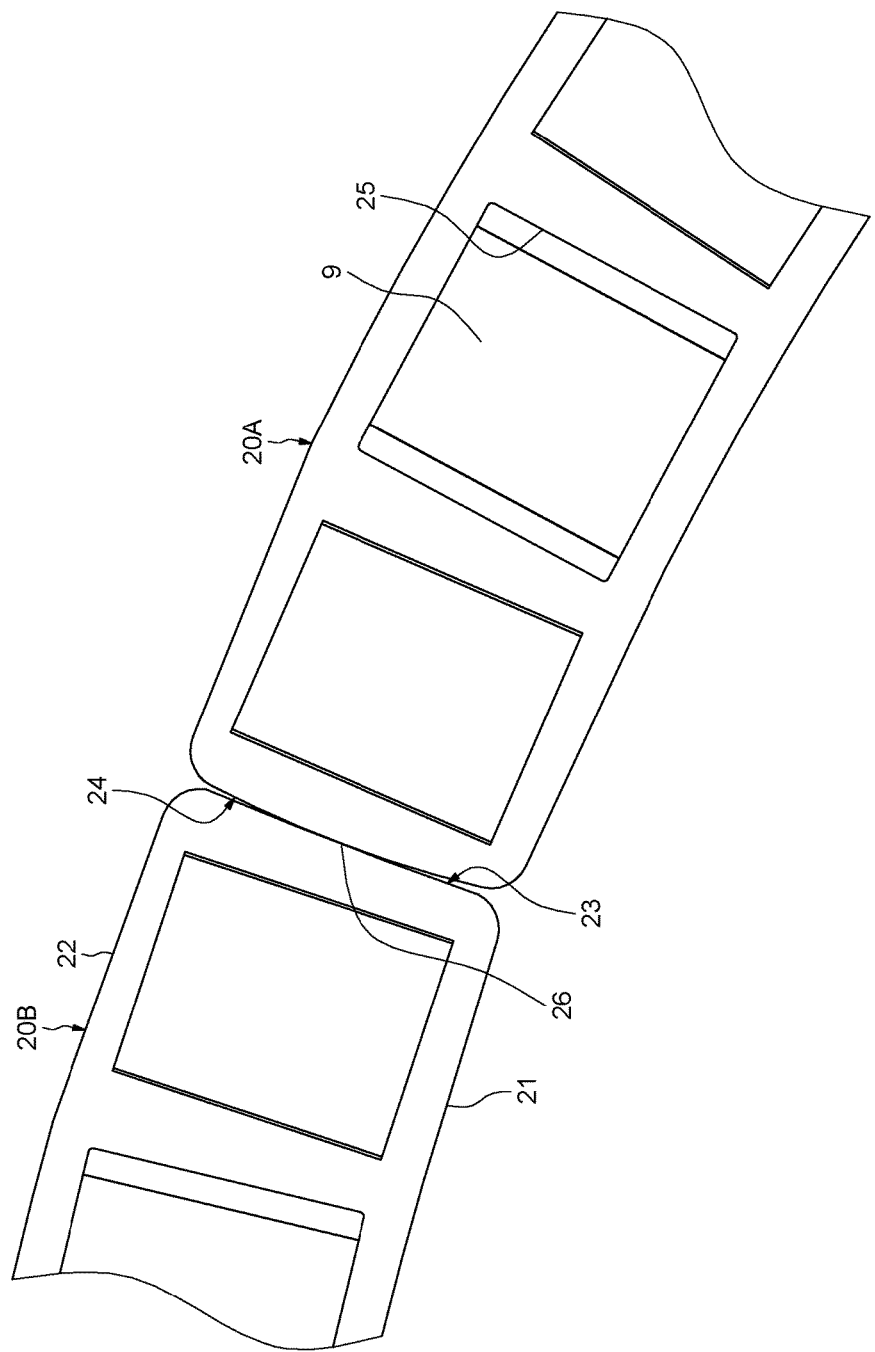
FIG. 6 is a top view of a portion of two segments of the cage, according to another embodiment.

As illustrated on FIG. 6, according to another embodiment, the end faces 23 and 24 of each segment 20 have one a concave cylindrical shape the other a concave cylindrical shape, the radius of the concave cylindrical shape being greater than the radius of the concave cylindrical shape.

Also in this case, the end faces 23 and 24 of two successive adjacent segments 20A and 20B are abutting along an axial contact line 26 as illustrated on FIG. 4, which is located substantially at an equivalent position.

Figure 7:
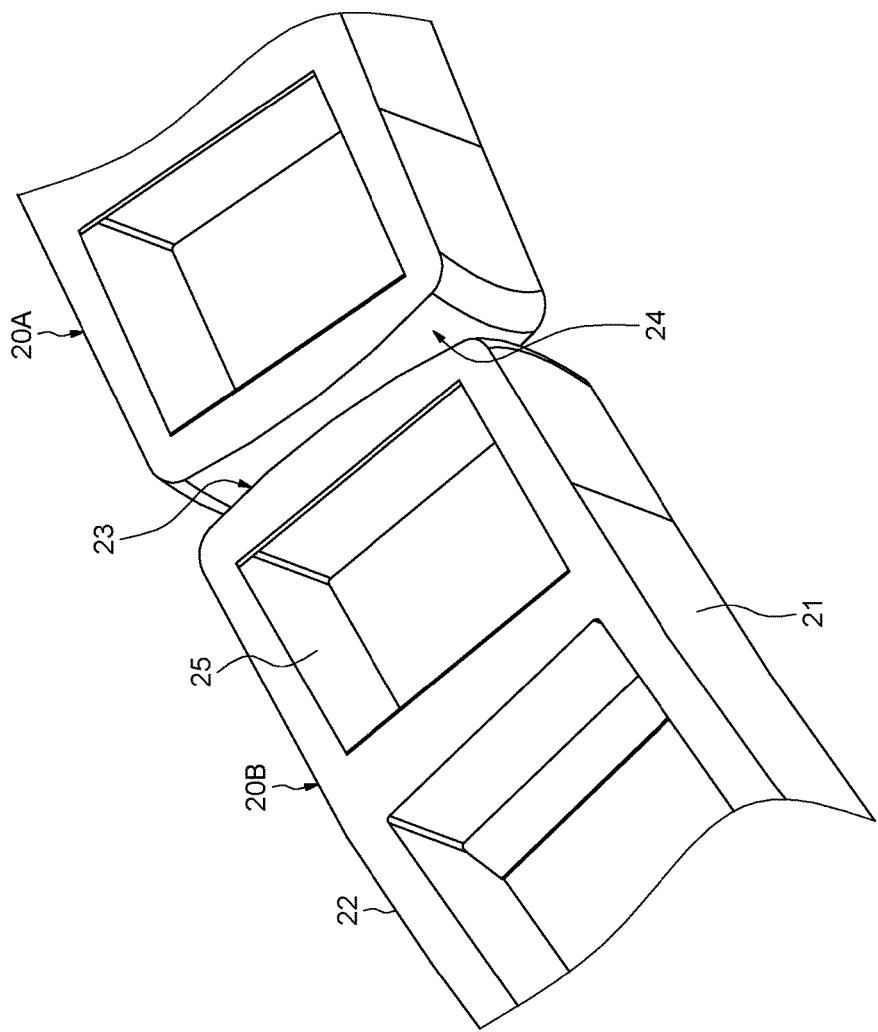
FIG. 7 is a perspective top view of a portion of two segments of the cage, according to another embodiment.
Figure 8:
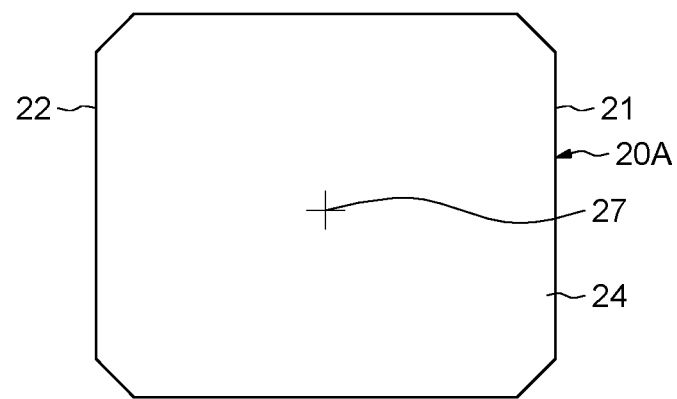
FIG. 8 is an end view of a segment of FIG. 3.

As illustrated on FIGS. 7 and 8, according to another embodiment, the end faces 23 and 24 of each segment 20 have convex dome shapes, such as portions of spherical shape, such that the end faces 23 and 24 of two successive adjacent segments 20A and 20B are abutting only on one contact point 27.

This contact point 27 is distant from the inner and outer circumferential cylindrical faces 21 and 22 thereof and located in a central zone of the end faces 23 and 24.

According to another embodiment (not shown), the end faces 23 and 24 of each segment 20 have one a convex dome shape and the other a flat shape. Also in this case, the end faces 23 and 24 of two successive adjacent segments 20A and 20B are abutting only on one contact point 27 as illustrated on FIG. 8.

The above-described specific shapes of the end faces 23 and 24 of the segments 20 of the cage 17 have the following advantages.

The abutting end faces 23 and 24 of two successive adjacent segments 20A and 20B can roll on each other relatively to the contact line 25 or the contact point 26.

The two successive adjacent segments 20A and 20B of the cage 17 can pivot radially with respect to each other, without substantially changing the circumferential length of the cage 17.

The adjacent end portions of adjacent segments 20A and 20B can move radially substantially simultaneously, towards the outer or towards the inner.

The present invention has been described regarding a cage receiving the rolling elements of a thrust bearing for supporting axial loads. The present invention can also be applied to a cage receiving the rolling elements of a bearing for supporting radial loads. The present invention can also be applied to a cage having segments each receiving only one rolling element.

The invention claimed is:

1. A bearing, comprising:
an inner ring having an inner raceway that, when viewed in axial cross section, is formed by a first radially extending axial surface,
an outer ring having an outer raceway that, when viewed in axial section, is formed by a second radially extending axial surface,
a plurality of rollers each located between the inner raceway and the outer raceway and making contact therewith, each roller having axial ends,
a cage formed by at least two successive segments each being able to receive more than one of the plurality of rollers, the segments each having an inner circumferential face and an outer circumferential face, the segments also each having a first end face and a second end face such that the first end face and the second end face of adjacent segments directly abut each other, the segments each having a distance between the inner circumferential face and the outer circumferential face that decreases proximate to the first end face and the second end face, wherein
the adjacent end faces are shaped to obtain only one contact line or contact point between them to allow pivoting such that the adjacent end faces of the at least two successive segments can pivot relative to each other to allow the adjacent end faces to move simultaneously in a radial direction without substantially changing a circumferential length of the cage, the contact point or contact line being distant from the inner and outer circumferential faces,
the inner ring, when viewed in axial section, forming a first axially extending radial surface located adjacent to the inner circumferential face of each segment,
the outer ring, when viewed in axial section, forming a second axially extending radial surface located adjacent to the outer circumferential face of each segment such that a portion of the cage is located between each of the axial ends of each roller and the first and second axially extending radial surfaces.

2. The bearing according to claim 1, wherein the contact point or contact line are located in central zones of the end faces distant from the inner and outer circumferential faces.

3. The bearing according to claim 1, wherein the first one of the end faces has a convex shape.

4. The bearing according to claim 3, wherein the second one of the end faces has a convex shape.

5. The bearing according to claim 3, wherein the second one of the end faces has a concave shape.

6. The bearing according to claim 3, wherein the second one of the faces has a flat shape.

7. The bearing according to claim 1, wherein the first end face has a convex cylindrical shape, with an axis parallel to an axis of the cage.

8. The bearing according to claim 7, wherein the second end face has a convex cylindrical shape.

9. The bearing according to claim 7, wherein the second end face has a concave cylindrical shape, the radius of the concave cylindrical shape being greater than the radius of the convex cylindrical shape.

10. The bearing according to claim 7, wherein the second end face has a flat shape.

11. The bearing according to claim 1, wherein the first end face has a convex spherical shape.

* * * * *